S. DAWSON.
THEFT PREVENTING SIGNAL.
APPLICATION FILED OCT. 4, 1916.
1,257,461.
Patented Feb. 26, 1918.
2 SHEETS—SHEET 1.
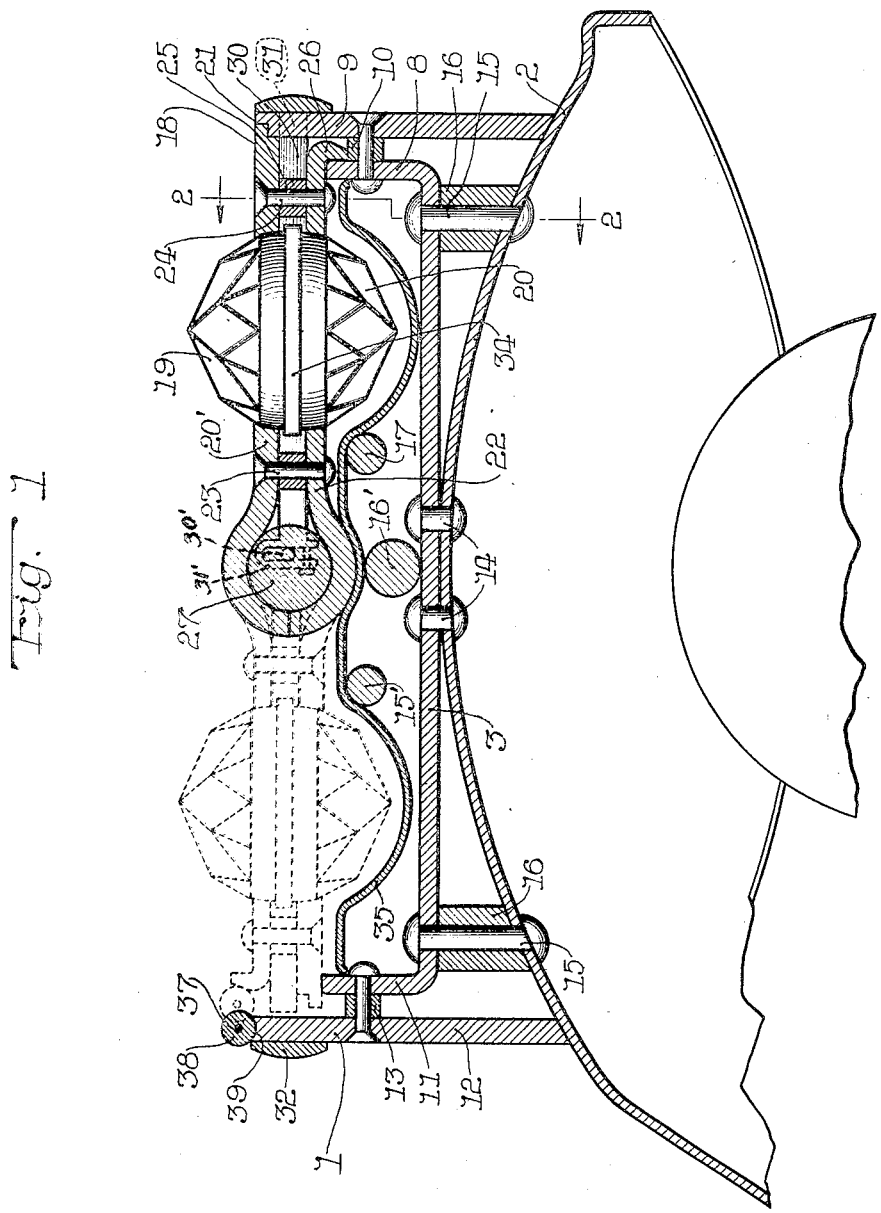
Inventor
Sidney Dawson
By Brown, Hanson & Boettcher
Attorneys S. DAWSON.
THEFT PREVENTING SIGNAL.
APPLICATION FILED OCT. 4, 1916.
1,257,461.
Patented Feb. 26, 1918.
2 SHEETS—SHEET 2.
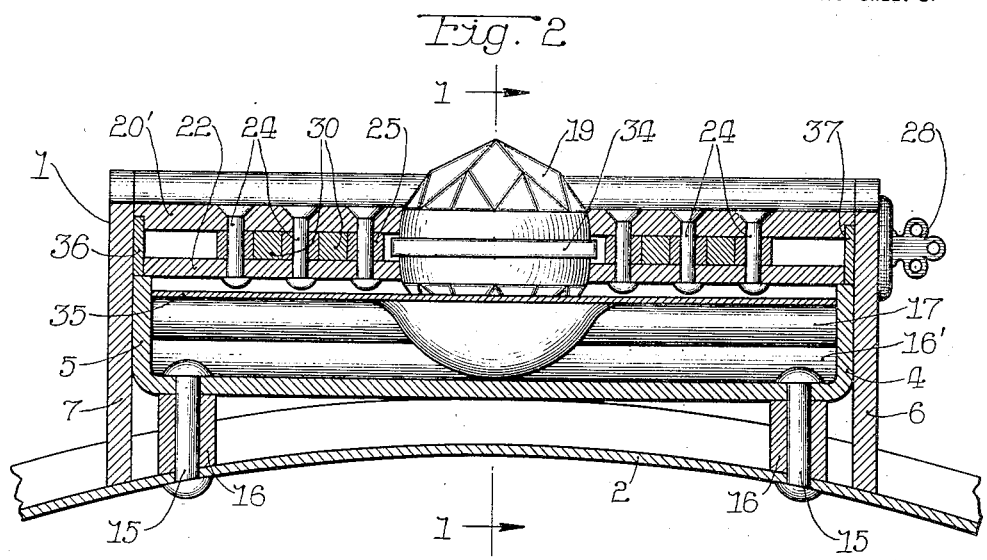
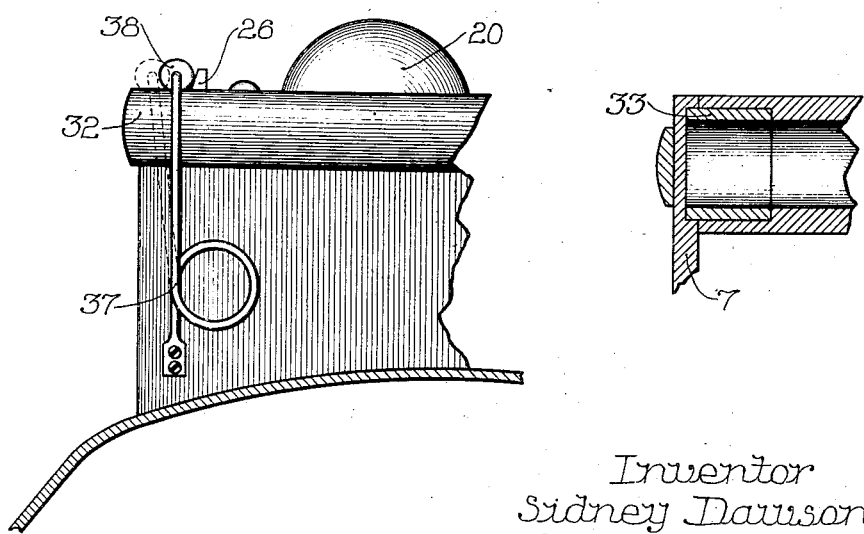
Inventor
Sidney Dawson
By Brown, Hanson & Boettcher
Attorneys

UNITED STATES PATENT OFFICE.

SIDNEY DAWSON, OF CHICAGO, ILLINOIS, ASSIGNOR OF ONE-HALF TO WILLIAM ROBERTSON, OF CHICAGO, ILLINOIS.

THEFT-PREVENTING SIGNAL.

1,257,461.  Specification of Letters Patent.  Patented Feb. 26, 1918.

Application filed October 4, 1916. Serial No. 123,786.

*To all whom it may concern:*

Be it known that I, SIDNEY DAWSON, a subject of the King of Great Britain, residing at Chicago, in the county of Cook and State of Illinois, have invented certain new and useful Improvements in Theft-Preventing Signals, of which the following is a full, clear, concise, and exact description, reference being had to the accompanying drawings, forming a part of this specification.

My invention is concerned with signaling means for preventing theft.

Broadly stated, my invention comprises means under the control of the owner of a vehicle or the like for displaying a distinctive signal which indicates whether the vehicle or the like is or is not under his control or operated by him. The particular structure which I have chosen to illustrate my invention comprises a signal having two distinctive indications. The signal is adapted to be mounted on the fender or in some prominent position on an automobile, and when the owner or his agent occupies and drives the car the signal is set to indicate that fact. When the car is left at the curb or is left in a garage or the like where it is no longer under the control of the owner or his authorized driver, the signal is placed in condition to indicate that fact. If now the car is operated by an unauthorized person, this unauthorized use will be at once apparent and the offender may be apprehended.

In the accompanying drawings which illustrate one embodiment of my invention—

Figure 1 is a transverse cross section taken on the lines 1—1 of Fig. 2;

Fig. 2 is a cross section taken on the lines 2—2 of Fig. 1;

Fig. 3 is a fragmentary detail view of the signal in "face" position showing the means for holding the signal stationary; and Fig. 4 is a fragmentary section illustrating the manner of pivoting the lock barrel.

The signal which I have illustrated comprises a rectangular frame 1, which is adapted to be mounted upon a prominent part of a vehicle such as an automobile or the like. In the drawings I have illustrated the frame 1 as mounted upon the fender 2 of an automobile. The open end of the rectangular frame is fastened to conform to the surface of the fender 2 in order to secure a close fit and a tight joint. The frame 1 is provided with an attaching plate 3 which is formed in the shape of a hollow pan having the flanges 4 and 5 resting flat against the front and rear end walls 6 and 7 respectively of the main frame 1. A flange 8 is provided along the side of the attaching frame 3, this flange 8 being spaced from the outer side wall 9 of the main frame member 1 by a spacer or filler block 10 through which suitable rivets or other attaching devices are passed. In a similar manner, the inner side edge of the attaching frame plate 3 is connected by a flange 11 to the inner side wall 12 of the main frame plate 1 with a spacing block 13 between the flange and the wall. The attaching frame plate 3 is secured at its center to the fender 2 by means of the rivets 14 and upon each side by means of the rivets 15 and the collar 16.

It is obvious that if a flat fender be employed instead of the round fender as is shown in the drawings, the main frame 1 and the attaching frame plate 3 would be constructed accordingly to rest flat upon the fender.

A plurality of bracing rods or rivets 15', 16' and 17, are disposed between the front and rear end walls 6 and 7 of the main frame 1, serving both to secure the flanges 4 and 5 to these end walls and to brace the end walls against forcible distortion or displacement. The signal or indicator proper comprises a carrier 18 upon which are mounted a pair of distinctive visual signals 19 and 20. The signals or targets 19 and 20 are preferably brilliants made of red and green glass respectively, formed in generally hemispherical shape.

The carrier 18 comprises an upper plate 20' which has its outer end rabbeted as shown at 21 to form a tight joint with the wall 9 of the main frame 1. A lower plate 22 is secured to the upper plate 20' by means of suitable rivets 23, 24, with suitable spacing blocks 25 between said plates. The plates 20' and 22 may in fact be one continuous plate. The outer end of the lower plate 22 is provided with a depending flange 26 which drops down into the space between the flange 8 and the side wall 9 upon the attaching plate and the main frame 1 respectively. This flange 26 coöperating with the flange 8 prevents the plates 20' and 22 being forced endwise to expose an opening at the rabbeted portion 21 where the upper plate 20' and the side wall 9 are in contact. The inner ends of the plate 20' and 22 are bent to form a cylindrical shell inclosing the barrel 27 of a suitable lock. The lock is provided with a suitable keyhole facing forward so that the proper key 28 may be inserted to throw the locking bolts 30 which are adapted to be thrown into suitable recesses 31 formed in the side wall 9. Connection is made between the bolts and the barrel by means of crank portions 35 formed in the barrel and yokes 31' carried by the inner ends of the bolts, best shown in dotted lines in Fig. 1. Any other mechanical connection between the lock barrel 27 and the bolt 30 may be employed which will reach the result desired, namely, reciprocation of the bolt in the signaling device to lock the same. I am not concerned particularly with the structure of the lock *per se* but only in the combination disclosed. A suitable strap or band 32 is fastened as by riveting or welding along the upper edge of the main frame 1 thereby covering the recesses 31 into which the bolts 30 are thrown. The cylindrical portions of the plates 20' and 22 which inclose the lock barrel 27 are pivoted to the front and rear walls 6 and 7 by means of suitable collars 33 which are set into coöperating recesses in the end walls 6 and 7 and in the plates 20' and 22.

The hemispherical brilliants 19 and 20 are set into suitable holes formed in the plates 20 and 22 and are separated by a suitable elastic pad 34 which may consist of felt, rubber, or the like.

The top of the attaching plate 3 is covered over by a pan 35 of light metal having suitable depressions to receive the brilliants and being conformed to fit as closely as possible about the hub which incloses the locking barrel 27. The pan 35 is provided to prevent dirt accumulating inside the box, as the same may be more readily removed from the pan. The bracing rod 16' prevents effectively the introduction of any tools or instruments under the signaling device for the purpose of tampering with the same. The side edges of the plates 36 and 37 are rigidly connected by welding or the like to the plates 20' and 22. It can thus be seen that the parts are entirely inclosed and are protected against manipulation or interference in any manner.

When, by the use of the key 28, the locking bolts 30 are withdrawn from the notches 31, the carrier 18 may be rotated about the barrel 27 into the position shown in dotted lines in Fig. 1. For the purpose of holding the carrier loosely in this position, and at the same time for preventing rattling, I have provided the spring 37 which bears at its upper end a roller 38. This roller normally rests in a groove 39 in the top of the wall 12 and also being adapted to rest between the wall 12 and the flange 26, as is shown in full lines in Fig. 3 and in dotted lines in Fig. 1.

The operation of the device will be apparent from the above description. Normally, when the owner is driving the car, the carrier 18 is placed in the dotted line position shown in Fig. 1. The green target or brilliant is then displayed indicating that the owner or his agent is driving the car. When the car is left at the curb the roller 38, which is mounted on the end of the spring 37, is pushed over into the groove 39 formed at the top of the wall 12, and the carrier 18 is thrown over into the full line position shown in Fig. 1, and the lock is operated to cause the bolts 30 to engage the notches 31. The car is thus left with the red signal displayed and if, at this time, the car should be stolen or taken by an unauthorized person it will at once be apparent from the fact that the red signal is displayed by the car while it is in motion on the street. It will be noted that the parts are very nicely fitted in order to prevent tampering with the apparatus or to prevent forcing of the lock. When the owner returns to the car to drive the same, he unlocks the carrier 18 and throws it over into the position shown in dotted lines in Fig. 1.

If the thief attempts to destroy the signal, this will at once be apparent to any observer. If the entire signal be torn off, it will leave a gaping hole in the fender which will be an indication of such action.

While I have described my invention with reference to the particulars of a certain embodiment, it is apparent that the invention may be embodied in other forms and that the details which I have described may be varied to suit conditions.

I claim:

1. In combination an open rectangular frame adapted to be mounted upon the fender of an automobile or the like, a supplemental frame plate for closing the bottom of said open frame, a longitudinal rod for bracing said open frame, a pan closing off the top of said supplemental plate, a pair of plates having holes therein, glass brilliants of different colors mounted in said plates, said brilliants facing in opposite direction, said plates being secured together to form a carrier for said brilliants, and being pivoted to said main frame, a lock mounted in the pivot of said plate, said lock having a bolt for holding the carrier in position to display one of said brilliants and spring means for holding said carrier in position to display the other of said brilliants.

2. In combination, a rectangular open frame a pair of plates in spaced relation and pivoted as a unit to said frame, said plates having a locking bolt between them for locking the plates in a predetermined position in said frame, indicators displayed on each of said plates, and a lock barrel for operating said bolt to hold said plates in position to display one of said signals.

3. In combination, an open rectangular frame, a supplemental frame plate for closing off the bottom of said open frame and for attachment to an automobile fender or the like, a longitudinal bolt for bracing said open frame and preventing insertion of an instrument beneath the frame, said supplemental frame plate having an upturned flange for securement to the main frame, a pair of plates forming as a unit a signal carrier, said plates lying parallel to each other and in spaced relation, locking bolts between said plates, signal indicators carried upon each of said plates and facing in opposite directions, one wall of said main frame having locking sockets therein, and means for operating said bolts to engage said locking sockets in said open frame.

4. In combination, an open rectangular frame, a carrier comprising a pair of plates in spaced relation, and connected to form a unit, said plates being pivoted in said main frame and carrying indicating means on opposite sides thereof, the pivot of said plates being a hollow hub, a lock in said hub, a plurality of bolts between said plates actuatable by said lock, and means to prevent tampering with the bolts.

5. In combination, an open rectangular frame, a signal carrier pivoted on said frame, said carrier having a hollow hub, locking means in said hub, said carrier comprising a pair of plates arranged in spaced relation to form a single unit, a bolt between said plates actuatable by the locking means to engage a socket in said main frame, and distinctive signals secured to each plate, said signals being adapted for display one at a time only.

6. In combination, a rectangular inclosing frame, a signal member pivoted therein and adapted for movement from one extreme position to the other to exhibit opposing indications, and locking means on the signal member operable from the pivot point to retain the member in one of the indicating positions.

7. In combination, a rectangular inclosing frame, a signal member pivoted therein and adapted for movement from one extreme position to the other to exhibit opposing indications, locking means on the signal member, and means adjacent the pivot point of said signal member to retain the member in one of the indicating positions.

In witness whereof, I hereunto subscribe my name this 29th day of September, 1916.

SIDNEY DAWSON.